United States Patent
Horn

(10) Patent No.: US 8,601,311 B2
(45) Date of Patent: Dec. 3, 2013

(54) SYSTEM AND METHOD FOR USING OVER-PROVISIONED DATA CAPACITY TO MAINTAIN A DATA REDUNDANCY SCHEME IN A SOLID STATE MEMORY

(75) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 353 days.

(21) Appl. No.: 12/967,228

(22) Filed: Dec. 14, 2010

(65) Prior Publication Data

US 2012/0151254 A1 Jun. 14, 2012

(51) Int. Cl.
*G06F 11/00* (2006.01)
(52) U.S. Cl.
USPC .......................................... 714/6.2; 714/6.24
(58) Field of Classification Search
None
See application file for complete search history.

(56) References Cited

U.S. PATENT DOCUMENTS

| | | | |
|---|---|---|---|
| 5,408,644 A | 4/1995 | Schneider et al. | |
| 5,499,337 A | 3/1996 | Gordon | |
| 6,467,022 B1 | 10/2002 | Buckland et al. | |
| 6,523,087 B2 | 2/2003 | Busser | |
| 6,959,413 B2 | 10/2005 | Humlicek et al. | |
| 7,069,382 B2 | 6/2006 | Horn et al. | |
| 7,200,715 B2 | 4/2007 | Kleiman et al. | |
| 7,409,492 B2 | 8/2008 | Tanaka et al. | |
| 7,640,390 B2 | 12/2009 | Iwamura et al. | |
| 7,653,778 B2 | 1/2010 | Merry, Jr. et al. | |
| 7,779,294 B2 | 8/2010 | Corrado et al. | |
| 7,856,528 B1 | 12/2010 | Frost et al. | |
| 8,321,597 B2 | 11/2012 | Yu et al. | |
| 8,402,217 B2 | 3/2013 | Burd | |
| 2004/0015657 A1 | 1/2004 | Humlicek et al. | |
| 2004/0123032 A1 | 6/2004 | Talagala et al. | |
| 2005/0066124 A1 | 3/2005 | Horn et al. | |
| 2005/0086429 A1 | 4/2005 | Chatterjee et al. | |
| 2005/0177672 A1 | 8/2005 | Rao | |
| 2006/0004957 A1 | 1/2006 | Hand, III et al. | |
| 2006/0236029 A1 | 10/2006 | Corrado et al. | |
| 2007/0268905 A1 | 11/2007 | Baker et al. | |
| 2007/0283079 A1 | 12/2007 | Iwamura et al. | |
| 2007/0294565 A1 | 12/2007 | Johnston et al. | |
| 2007/0297265 A1 | 12/2007 | Kim et al. | |
| 2008/0133969 A1 | 6/2008 | Manoj | |
| 2008/0141054 A1 | 6/2008 | Danilak | |
| 2008/0155160 A1 | 6/2008 | McDaniel | |
| 2008/0229148 A1 | 9/2008 | Forhan et al. | |
| 2008/0276124 A1 | 11/2008 | Hetzler et al. | |
| 2009/0073762 A1 | 3/2009 | Lee et al. | |
| 2009/0083504 A1 | 3/2009 | Belluomini et al. | |
| 2009/0150599 A1 | 6/2009 | Bennett | |
| 2009/0172335 A1 | 7/2009 | Kulkarni et al. | |

(Continued)

FOREIGN PATENT DOCUMENTS

WO    WO 2010049928 A1    5/2013

*Primary Examiner* — Michael Maskulinski

(57) ABSTRACT

Redundant "parity" RAID (5, 6, 50, 60) is a well-known technique for increasing data reliability beyond the failure rate of an individual storage device. In many implementations of redundant RAID, when a storage element is lost, a replacement or spare element is required to restore redundancy. A typical solid state storage device is over-provisioned with more storage media than is required to satisfy the specified user capacity. Embodiments of the present invention utilize the additional over-provisioned capacity and potentially modify the stripe size to restore RAID redundancy when a storage element or path (i.e., page, block, plane, die, channel, etc.) has failed. In some cases, this may also involve reducing the RAID stripe size.

13 Claims, 4 Drawing Sheets

(56) References Cited

U.S. PATENT DOCUMENTS

| | | |
|---|---|---|
| 2009/0204852 A1 | 8/2009 | Diggs et al. |
| 2009/0210744 A1 | 8/2009 | Kamalavannan |
| 2009/0248998 A1 | 10/2009 | Sato et al. |
| 2009/0327604 A1 | 12/2009 | Sato et al. |
| 2009/0327803 A1 | 12/2009 | Fukutomi et al. |
| 2010/0049914 A1 | 2/2010 | Goodwin |
| 2010/0064111 A1 | 3/2010 | Kunimatsu et al. |
| 2010/0088557 A1 | 4/2010 | Weingarten et al. |
| 2010/0088579 A1 | 4/2010 | Hafner et al. |
| 2010/0115175 A9 | 5/2010 | Zhuang et al. |
| 2010/0122115 A1 | 5/2010 | Olster |
| 2010/0169543 A1 | 7/2010 | Edgington et al. |
| 2010/0262773 A1 | 10/2010 | Borchers et al. |
| 2010/0281202 A1 | 11/2010 | Abali et al. |
| 2011/0035548 A1 | 2/2011 | Kimmel et al. |
| 2011/0126045 A1* | 5/2011 | Bennett ............ 714/6.22 |
| 2011/0173484 A1* | 7/2011 | Schuette et al. .......... 714/2 |
| 2011/0191649 A1 | 8/2011 | Lim et al. |
| 2011/0219259 A1 | 9/2011 | Frost et al. |
| 2011/0264843 A1* | 10/2011 | Haines et al. .......... 711/103 |
| 2011/0314218 A1 | 12/2011 | Bert |
| 2012/0079318 A1 | 3/2012 | Colgrove et al. |
| 2012/0110376 A1 | 5/2012 | Dreifus et al. |
| 2012/0151253 A1 | 6/2012 | Horn |
| 2012/0173790 A1 | 7/2012 | Hetzler et al. |
| 2012/0233406 A1 | 9/2012 | Igashira et al. |
| 2012/0246403 A1 | 9/2012 | McHale et al. |

* cited by examiner

SYSTEM AND METHOD FOR USING OVER-PROVISIONED DATA CAPACITY TO MAINTAIN A DATA REDUNDANCY SCHEME IN A SOLID STATE MEMORY

BACKGROUND

Many data storage components such as hard disks and solid state drives have certain advertised reliability guarantees that the manufacturers provide to customers. For example, certain solid state drive manufacturers guarantee a drive failure rate of $10^{-16}$ or $10^{-17}$. To increase data reliability, a data redundancy scheme such as RAID (Redundant Arrays of Independent Disks) is used to increase storage reliability. The redundancy may be provided by combining multiple storage elements within the storage device into groups providing mirroring and/or error checking mechanisms. For example, various memory blocks of a solid state storage device may be combined into stripes in which user data is stored.

BRIEF DESCRIPTION OF THE DRAWINGS

Systems and methods which embody the various features of the invention will now be described with reference to the following drawings, in which.

DETAILED DESCRIPTION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Redundant "parity" RAID (5, 6, 50, 60) is a well-known technique for increasing data reliability beyond the failure rate of an individual storage device. In many implementations of redundant RAID, when a storage element is lost, a replacement or spare element is required to restore redundancy. A typical solid state storage device is over-provisioned with more storage media than is required to satisfy the specified user capacity. Embodiments of the present invention utilize the additional over-provisioned capacity and potentially modify the stripe size to restore RAID redundancy when a storage element or path (i.e. page, block, plane, die, channel, etc.) has failed.

A common approach to overcome storage element failure is to use "parity" RAID to enable data recovery should a read failure occur. Typically, a target number of storage elements (i.e., sectors, flash pages, etc.) per stripe is chosen to achieve a desired reliability at a given cost in storage overhead.

A typical solution for restoring redundancy in a degraded RAID system is to replace the failed storage element and reconstruct the missing data on that element. Alternately, the system could be provided with a spare that is consumed when the first failure occurs. The original RAID overhead, system capacity, and reliability are thus restored. However, in a solid state storage system that uses RAID redundancy, failed elements (e.g., devices) cannot be practically replaced and providing spare elements in case of failure may be cost prohibitive.

Embodiments of the invention provide an alternative to the impractical solution of exchanging a failed storage element in a solid state storage device with a functioning element. Embodiments of the invention restore RAID redundancy/user data protection in a storage system with a failed storage element (e.g., page, block, plane, die, channel, etc.) by using capacity originally allocated for over-provisioning. In some cases, this may also involve reducing the RAID stripe size.

System Overview

Figure 1:
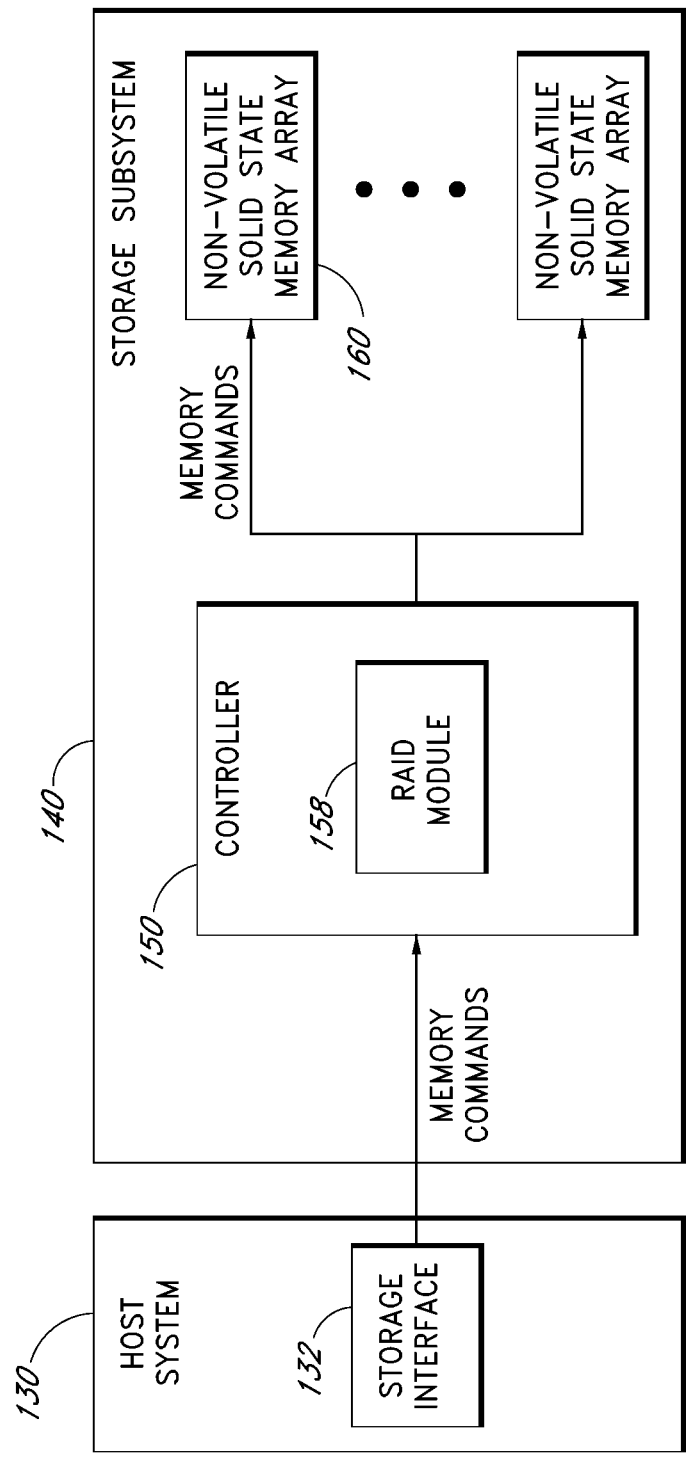
FIG. 1 is a block diagram illustrating a storage subsystem implementing a data redundancy scheme according to one embodiment.

FIG. 1 is a block diagram illustrating a storage subsystem implementing a data redundancy scheme according to one embodiment. As shown, a storage subsystem 140 includes a controller 150 and one or more non-volatile solid-state memory arrays 160. The controller 150 in one embodiment in turn includes a RAID module 158. In one embodiment, the RAID module 158 is configured to execute data access commands to maintain a data redundancy scheme in the storage subsystem. For example, the RAID module 158 may maintain data on which storage elements are assigned to which RAID stripes.

In one embodiment, the controller 150 of the storage subsystem 140 is configured to receive and execute commands from a storage interface 132 in a host system 130. The memory commands from the storage interface 132 may include write and read commands issued by the host system 130. As further shown in FIG. 1, in one embodiment, the controller 150 executes the received commands in one or more non-volatile solid-state memory arrays 160.

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, those skilled in art will appreciate that RAID is not limited to storage devices with physical disks and is applicable to a wide variety of storage devices including the non-volatile solid state devices described herein.

Using Over-Provisioning Capacity

Figure 2:
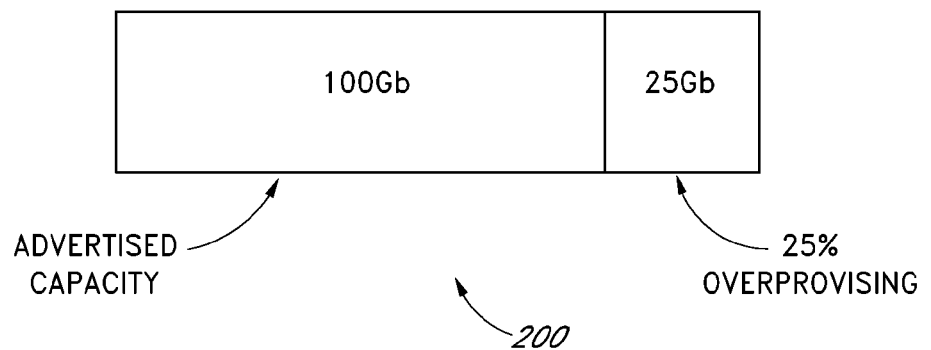
FIG. 2 illustrates an example storage subsystem with over-provisioning according to one embodiment.

FIG. 2 illustrates an example storage subsystem with over-provisioning according to one embodiment. As discussed above, a typical solid state storage device is over-provisioned with more storage media than is required to satisfy the specified user capacity quota. The example device as shown has an advertised user data capacity of 100 Gb when its actual capacity is 125 Gb. This means that 25% of the capacity is reserved for over-provisioning, which is used for accommodating garbage collection. Garbage collection is typically needed as new data is typically not written over existing data but instead in an available area of the solid state storage subsystem. Over time the storage subsystem will contain a mix of valid and invalid data and the garbage collection copies the valid data from a memory unit (such as a block) to another memory location before erasing the entire block and making it available for future writes. It is noted that the over-provisioning capacity quota is not tied to a particular group of storage elements but exists as excess capacity throughout the storage subsystem.

Figure 3:
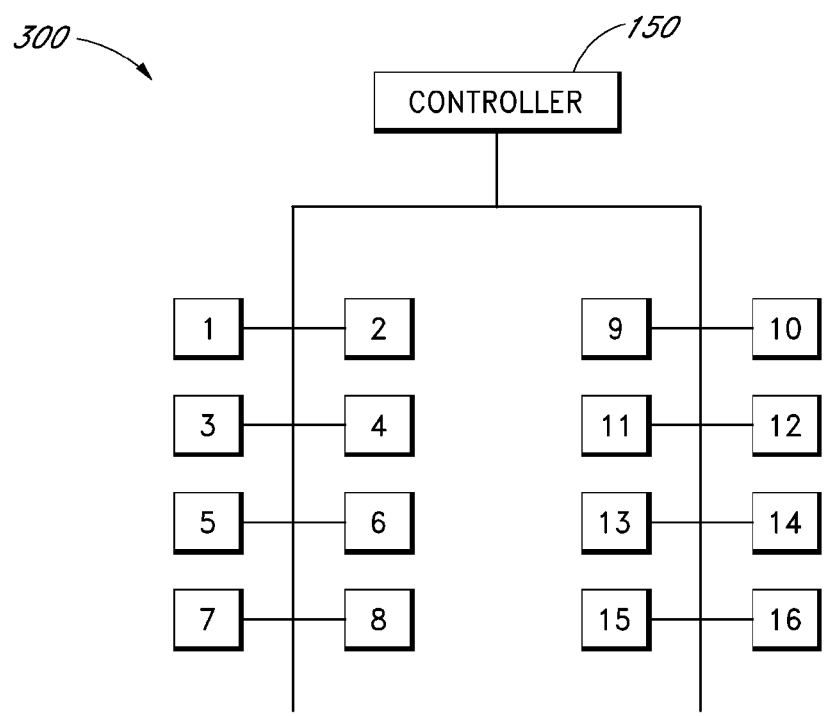
FIG. 3 illustrates an example set of storage data elements that are used in one embodiment.

FIG. 3 illustrates an example set of storage data elements that are used in one embodiment. Depicted in FIG. 3 are 16 dies that are accessible by the controller 150. In this simplified data redundancy scheme example, data stripes may span 15 dies (Dies 1-15) with the parity data being written on Die 16. The advertised user data quota includes the capacity of 14 dies, meaning that the capacity of two dies is the over-provisioning data quota. In this example, if Die 1 fails, embodiments of the invention would rebuild the data stripes. The re-striping process would rebuild the affected stripes across the remaining Dies 2-15, thus using more of the capacity previously allocated to the over-provisioning data quota. In this process, the over-provisioning data quota went from (12.5%) 2/16 to 1/16 (6.66%). The reduction of over-provisioning data quota has an adverse effect on write amplification, an effect that describes the additional write operations that are performed when a write memory command is serviced due to the need for garbage collection. Garbage collection would have to be conducted more frequently with the reduction of the over-provisioning data quota. In one embodiment, the storage subsystem must maintain a certain minimum amount of over-provisioning data quota. Thus, in one embodiment, the controller checks whether that minimum amount has been met before using additional over-provisioning data quota in the recovery process.

Recovery Processes

Figure 4:
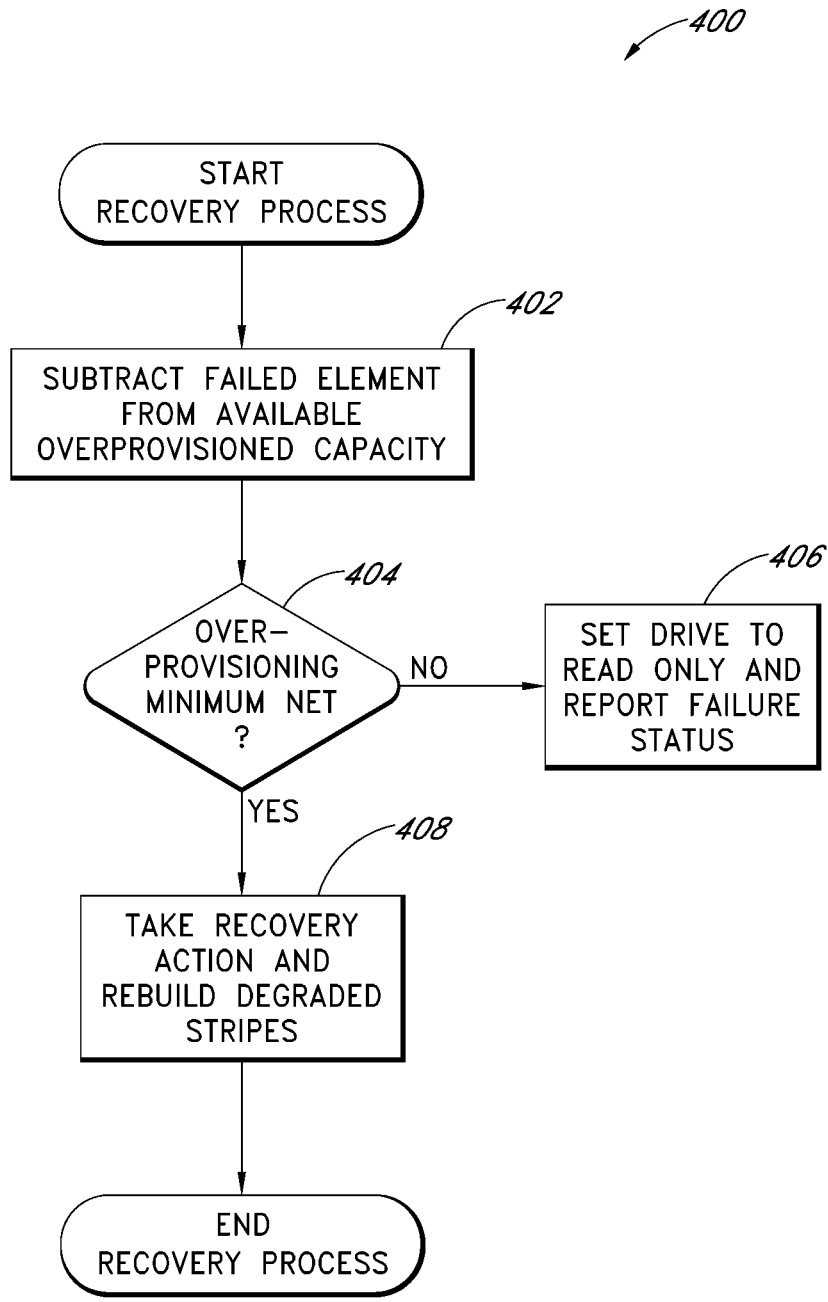
FIG. 4 is a flow diagram illustrating the process of using over-provisioned storage capacity to recover from a storage element failure according to one embodiment.

FIG. 4 is a flow diagram illustrating the process of using over-provisioned storage capacity quota to recover from a storage element failure according to one embodiment. The recovery process 400 in one embodiment may be undertaken by the controller 150 when the controller detects a failure in a storage element. The process begins in block 402, where the failed element is subtracted from the available over-provisioned capacity quota. Then in block 404, the process determines whether the over-provisioning minimum is met (e.g., whether there is still sufficient over-provisioning capacity). If it has not, this means no more "spare" capacity can be re-purposed to replace the failed element. If this is the case, the process in block 406 sets the storage device to a "read only" status and reports a failure status. This is because without the requisite minimum over-provisioning capacity to replace the failed element, the storage device cannot create any new data redundancy stripes to accommodate the arrival of new write data. On the other hand, if it is determined that the over-provisioning minimum has been met in block 404, then the process takes recovery action in block 408 and rebuilds degraded stripes affected by the failed element. After the building of the stripes, the process ends.

Figure 5:
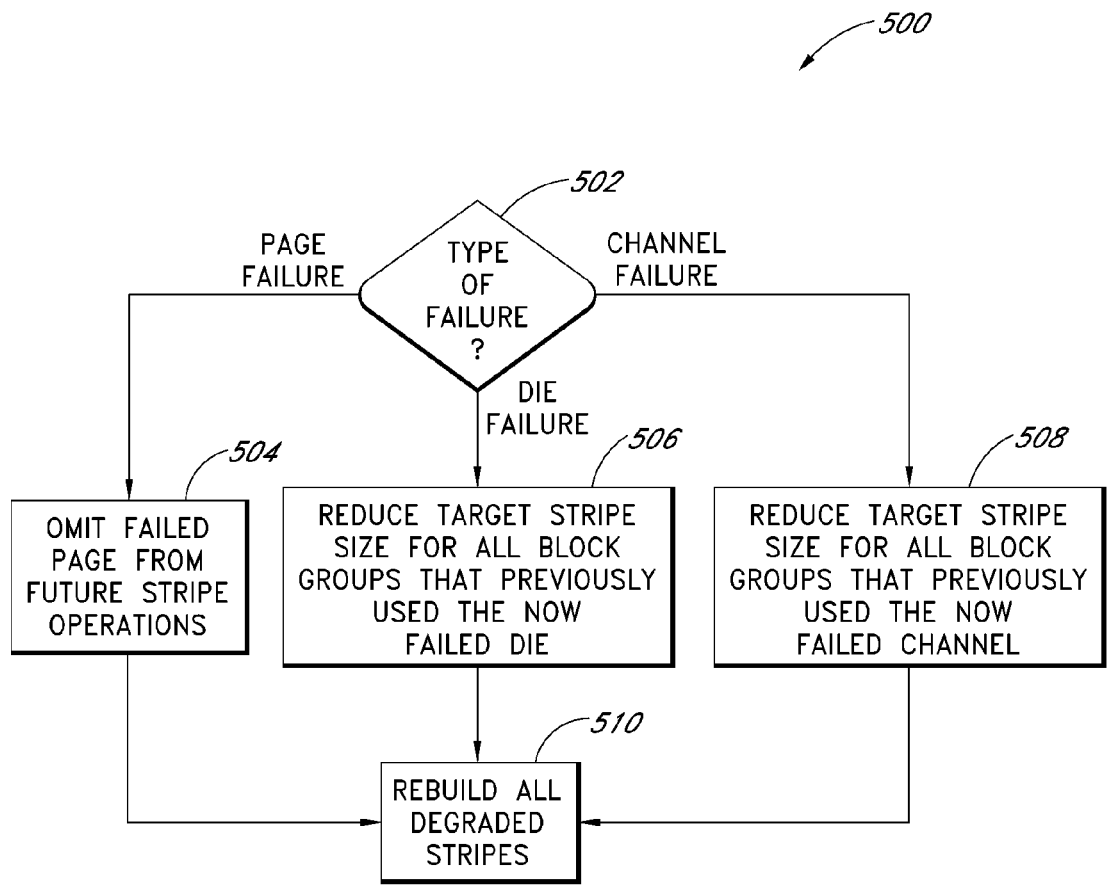
FIG. 5 is a flow diagram illustrating the recovery processes taken for different types of storage element failure according to one embodiment.

FIG. 5 is a flow diagram illustrating the recovery processes taken for different types of storage element failure according to one embodiment. In one embodiment, the recovery action taken in block 408 is dependent on the type of storage element that has failed. In block 502, the controller determines the type of storage failure that it has detected. If it is page failure, the controller is configured to omit the failed page from future stripe operations in block 504. This may include updating information maintained in the RAID module 156. The controller then rebuilds all degraded stripes affected by the page failure by using another page.

If the controller encounters a die failure, then in block 506 the controller is configured to reduce the target stripe size for all block groups that previously used the now failed die. If the controller encounters a channel failure, then in block 508 the controller is configured to reduce the target stripe size for all block groups that previously used the now failed channel. In either case, the controller then rebuilds all degraded stripes affected by the die/channel failure in block 510.

Conclusion

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A solid-state storage subsystem comprising:
a non-volatile memory array comprising a user data quota portion and an over-provisioning quota portion, each quota portion comprising a plurality of solid-state storage elements; and
a controller configured to:
implement a data redundancy configuration with a plurality of data stripes, each data stripe comprising a respective subset of the plurality of storage elements of the user data quota portion; and
be responsive to a failure of a storage element of the user data quota portion by at least:
replacing the failed storage element of the user data quota portion with one of the storage elements of the over-provisioning quota portion; and
rebuilding one or more of the data stripes that include the failed storage element using the storage element from the over-provisioning quota portion.

2. The solid-state storage subsystem of claim 1, wherein the controller is further configured to perform the replacement of storage elements and rebuilding of data stripes only when a capacity of the over-provisioning quota portion is above a pre-defined minimum size, the pre-defined minimum being a value that exceeds an amount needed to replace a storage element.

3. The solid-state storage subsystem of claim 1, wherein the storage elements comprise a plurality of pages, blocks, dies, devices or channels.

4. The solid-state storage subsystem of claim 1, wherein the data redundancy configuration is a redundant array of independent disks (RAID) configuration.

5. A method of maintaining data redundancy in a solid-state storage subsystem in the event of a storage element failure, the method comprising:
dividing a non-volatile memory array of the solid-state storage subsystem into a user data quota portion and an over-provisioning quota portion, each quota portion comprising a plurality of storage elements, the user data quota portion storing a plurality of stripes that are arranged in accordance with a data redundancy configuration, each data stripe comprising a respective subset of the plurality of storage elements in the user data quota portion; and
in response to detecting a failure in a storage element in the user data quota portion,
removing the failed storage element from one or more of the data stripes that include the failed storage element;
rebuilding the one or more data stripes; and prior to rebuilding the one or more data stripes, determining if a capacity of the over-provisioning quota portion is above a pre-defined minimum size, the pre-defined minimum being a value that exceeds an amount needed to replace a storage element.

6. The method of claim 5, wherein the storage elements comprise a plurality of pages, blocks, dies, devices or channels.

7. The method of claim 6, further comprising:
prior to rebuilding the one or more data stripes, replacing the failed storage element with a storage element from the over-provisioning quota portion when the failed storage element is a die, a device, or a channel.

8. The method of claim 5, wherein the data redundancy configuration is a redundant array of independent disks (RAID) configuration.

9. A method of maintaining data redundancy in a solid-state storage subsystem in the event of a storage element failure, the method comprising:
dividing a non-volatile memory array of the solid-state storage subsystem into a user data quota portion and an over-provisioning quota portion, each quota portion comprising a plurality of storage elements, the user data quota portion storing a plurality of stripes that are arranged in accordance with a data redundancy configuration, each data stripe comprising a respective subset of the plurality of storage elements in the user data quota portion; and
in response to detecting a failure in a storage element in the user data quota portion,
replacing the failed storage element of the user data quota portion with one of the storage elements of the over-provisioning quota portion; and
rebuilding the one or more data stripes.

10. The method of claim 9, further comprising:
prior to rebuilding the one or more data stripes, determining if a capacity of the over-provisioning quota portion is above a pre-defined minimum size, the pre-defined minimum being a value that exceeds an amount needed to replace a storage element.

11. The method of claim 9, wherein the storage elements comprise a plurality of pages, blocks, dies, devices or channels.

12. The method of claim 11, further comprising:
prior to rebuilding the one or more data stripes, replacing the failed storage element with a storage element from the over-provisioning quota portion when the failed storage element is a die, a device, or a channel.

13. The method of claim 9, wherein the data redundancy configuration is a redundant array of independent disks (RAID) configuration.

* * * * *